T. J. GOFF.
Machine for Making Hay.
No. 24,386.
Patented June 14, 1859.
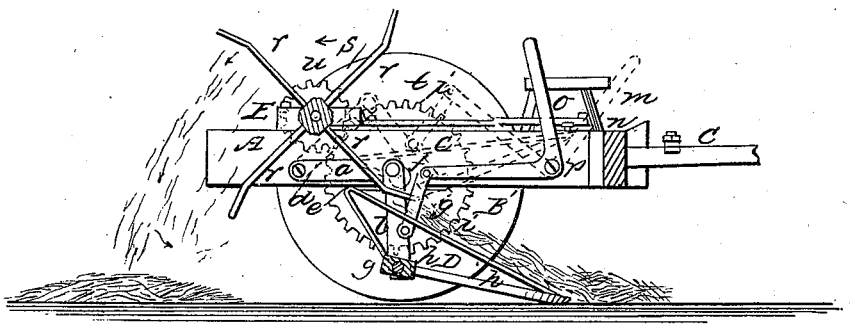
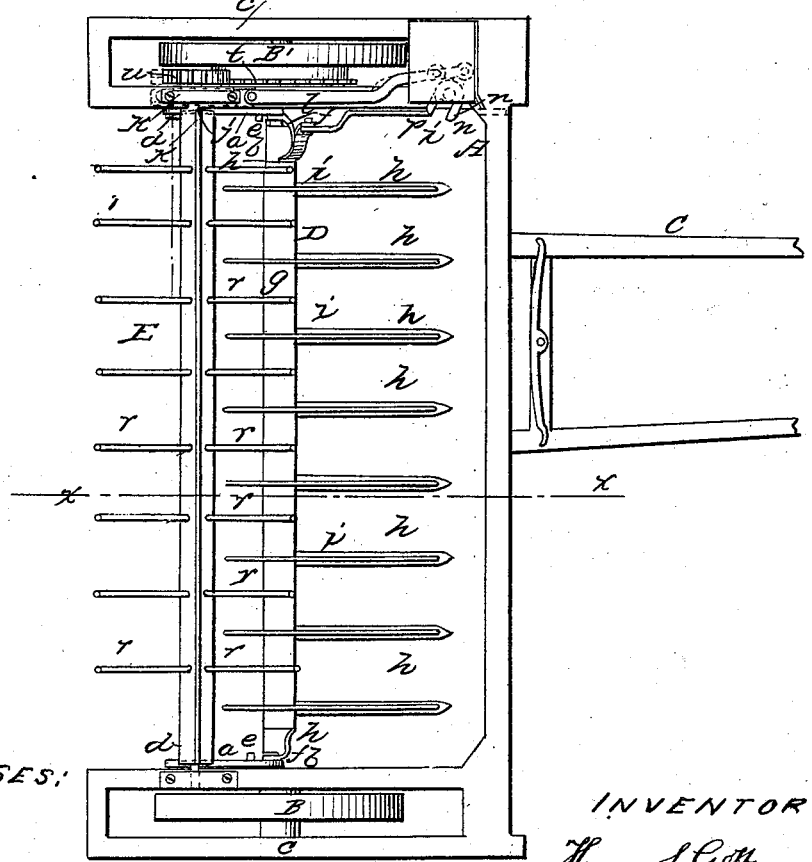
WITNESSES:
Geo Cole
Charles Randall
INVENTOR
Thomas J Goff

UNITED STATES PATENT OFFICE.

THOMAS J. GOFF, OF WARREN, RHODE ISLAND.

IMPROVEMENT IN MACHINES FOR MAKING HAY.

Specification forming part of Letters Patent No. 24,386, dated June 14, 1859.

*To all whom it may concern:*

Be it known that I, THOMAS J. GOFF, of Warren, in the county of Bristol and State of Rhode Island, have invented a new and Improved Machine for Making Hay; and I do hereby declare that the following is a full, clear, and exact description of the same, reference being had to the annexed drawings, making a part of this specification, in which—

Figure 1 is a vertical section of my invention, taken in the line $x\,x$, Fig. 2. Fig. 2 is a plan or top view of the same.

Similar letters of reference indicate corresponding parts in the two figures.

This invention consists in the employment or use of a gathering and a revolving rake fitted in a frame which is mounted on wheels, and arranged and combined as hereinafter, fully shown and described, whereby the grass, as it is left by the mowing-machine, may be expeditiously turned for the purpose of being properly cured or made into hay.

The object of the invention is to expedite the process of making hay, so that the work may be done with a speed commensurate with the cutting of the grass by a machine, and grass cut, cured, and harvested in propitious weather on the same day.

To enable those skilled in the art to fully understand and construct my invention, I will proceed to describe it.

A represents a horizontal frame, which is mounted on wheels B B, and has thills C attached to it.

In the frame A a rake, D, is suspended by arms $a\,a\,b\,b$. The arms $a$ are attached, one to the inner side of each side piece, $c$, of the frame A, said arms being attached at their back ends to the side pieces by pivots $d$, their front parts resting on pins $e$. The arms $b\,b$ are attached by pivots $f$ to the front ends of the arms $a\,a$, and between the lower ends of the arms $b\,b$ the head $g$ of the rake D is secured by pivots $h$, the head being allowed to work freely on said pivots.

To the head $g$ a series of teeth, $h$, are attached at right angles and at equal distances apart. These teeth, together with the head, may be of wood; but supplemental teeth $i$ are used, which are formed of metal rods, bent and attached to the head $g$ and front ends of the teeth $h$, so as to form quite steeply inclined teeth, as shown clearly in Fig. 1.

On the back part of the frame A a revolving rake, E, is placed, one of the journals $j$ of which is fitted in a sliding bearing, $k$, to which a rod, $l$, is attached. The front end of the rod $l$ is attached by a pivot, $m$, to a lever, $n$, which is secured to one of the side pieces, $c$, said lever being forked at its inner end and having the upper part of a bent lever, $o$, fitted in it, the lower part of said lever being attached by a pivot, $p$, to an arm, $q$, which is pivoted to one of the arms $b$. The rake E is formed of a series of teeth, $r$, attached to a suitable shaft, $s$, the teeth $r$ being sufficiently long to pass between the upper and back parts of the teeth $i$.

To the inner side of one wheel, B', a toothed wheel, $t$, is attached, and into this wheel $t$, when the implement is in operation, a pinion, $u$, on the shaft $s$ gears.

The operation is as follows: As the machine is drawn along the rake E is rotated by the gearing $t\,u$ in the direction indicated by the arrows, the rake D gathers the grass from the ground, and the rake E turns it as it is discharged on the ground. The operation of the rake E is such that the grass is not scattered, but rather turned in masses or layers, so that it will be fully acted upon by the sun and still not be separated and scattered so as to be burnt or have its juices completely dried up. The rake D, in consequence of being suspended in the frame A, as shown, is allowed to rise and fall freely to conform to the inequalities of the surface of the ground and pass over all obstacles, and when the machine is not designed to be used, and is being drawn from place to place, the attendant throws forward the upper part of lever $o$, and the rake D is thereby elevated free from the ground, and the pinion $u$ at the same time thrown out of gear with the wheel $t$ in consequence of the lever $o$ actuating the lever $n$, rod $l$, and bearing $k$.

I am aware that machines for turning cut grass have been previously devised, and I also am aware that revolving rakes have been used in such machines; but I am not aware that a gathering and revolving rake has been arranged and placed within a mounted frame so as to operate conjointly, as described, and admit of being rendered inoperative by the movement of a single lever. I do not claim, therefore, separately and irrespective of arrangement, either of the parts; but I do claim as new and desire to secure by Letters Patent—

The combination of the gathering-rake D and revolving rake E, when arranged for joint operation substantially as and for the purpose set forth.

THOMAS J. GOFF.

Witnesses:
GEO. COLE,
CHARLES RANDALL.